(12) United States Patent
Burhani et al.

(10) Patent No.: US 11,715,017 B2
(45) Date of Patent: Aug. 1, 2023

(54) TRADE PLATFORM WITH REINFORCEMENT LEARNING

(71) Applicant: ROYAL BANK OF CANADA, Montreal (CA)

(72) Inventors: Hasham Burhani, Peterborough (CA); Shary Mudassir, Toronto (CA); Xiao Qi Shi, Toronto (CA); Connor Lawless, Toronto (CA); Weiguang Ding, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 1071 days.

(21) Appl. No.: 16/426,196

(22) Filed: May 30, 2019

(65) Prior Publication Data

US 2019/0370649 A1    Dec. 5, 2019

Related U.S. Application Data

(60) Provisional application No. 62/677,733, filed on May 30, 2018.

(51) Int. Cl.
*G06N 3/02* (2006.01)
*G06N 3/088* (2023.01)
(Continued)

(52) U.S. Cl.
CPC ............ *G06N 3/088* (2013.01); *G06N 3/02* (2013.01); *G06N 20/00* (2019.01); *G06Q 40/04* (2013.01)

(58) Field of Classification Search
CPC .......... G06N 3/088; G06N 20/00; G06N 3/02; G06Q 40/04
See application file for complete search history.

(56) References Cited

U.S. PATENT DOCUMENTS

| 2002/0046134 | A1* | 4/2002 | Egashira | G06Q 30/0633 |
| | | | | 705/26.3 |
| 2017/0109824 | A1* | 4/2017 | Gunzinger | G06Q 40/02 |
| 2018/0040068 | A1 | 2/2018 | Noonan | |

FOREIGN PATENT DOCUMENTS

CN        105894379 A    8/2016

OTHER PUBLICATIONS

Bhatt, Shweta. "Reinforcement Learning 101." Medium, Towards Data Science, Mar. 19, 2018, https://towardsdatascience.com/reinforcement-learning-101-e24b50e1d292. (Year: 2018).*

(Continued)

*Primary Examiner* — Tsu-Chang Lee
(74) *Attorney, Agent, or Firm* — Norton Rose Fulbright Canada LLP

(57) ABSTRACT

Systems are methods are provided for training an automated agent. The automated agent maintains a reinforcement learning neural network and generates, according to outputs of the reinforcement learning neural network, signals for communicating resource task requests. First and second task data are received. The task data are processed to compute a first performance metric reflective of performance of the automated agent relative to other entities in a first time interval, and a second performance metric reflective of performance of the automated agent relative to other entities in a second time interval. A reward for the reinforcement learning neural network that reflects a difference between the second performance metric and the first performance metric is computed and provided to the reinforcement learning neural network to train the automated agent.

27 Claims, 7 Drawing Sheets

(51) Int. Cl.
G06Q 40/04 (2012.01)
G06N 20/00 (2019.01)

(56) References Cited

OTHER PUBLICATIONS

Moradi, Milad. "A centralized reinforcement learning method for multi-agent job scheduling in Grid." 2016 6th International Conference on Computer and Knowledge Engineering (ICCKE). IEEE, 2016 (Year: 2016).*
Gite, Shreyas. "Practical Reinforcement Learning—02 Getting Started with Q-Learning." Medium, Towards Data Science, Apr. 4, 2017, https://towardsdatascience.com/practical-reinforcement-learning-02-getting-started-with-q-learning-582f63e4acd9. (Year: 2017).*
Hendricks, Dieter, and Diane Wilcox. "A reinforcement learning extension to the Almgren-Chriss framework for optimal trade execution." 2014 IEEE Conference on Computational Intelligence for Financial Engineering & Economics (CIFEr). IEEE, 2014 (Year: 2014).*
European Search Report issued in European Application No. 19177515.4-1217, dated Sep. 9, 2019.

* cited by examiner

TRADE PLATFORM WITH REINFORCEMENT LEARNING

CROSS-REFERENCE TO RELATED APPLICATIONS

This application claims all benefit including priority to U.S. Provisional Patent Application 62/677,733, filed May 30, 2018, and entitled "TRADE PLATFORM WITH REINFORCEMENT LEARNING"; the entire contents of which are hereby incorporated by reference herein.

FIELD

The present disclosure generally relates to the field of computer processing and reinforcement learning.

BACKGROUND

A reward system is an aspect of a reinforcement learning neural network, indicating what constitutes good and bad results within an environment. Reinforcement learning processes can require a large amount of data. Learning by reinforcement learning processes can be slow.

SUMMARY

In accordance with an aspect, there is provided a computer-implemented system for training an automated agent. The system includes a communication interface, at least one processor, memory in communication with the at least one processor, and software code stored in the memory. The software code, when executed at the at least one processor causes the system to: instantiate an automated agent that maintains a reinforcement learning neural network and generates, according to outputs of the reinforcement learning neural network, signals for communicating resource task requests; receive, by way of the communication interface, first task data including values of a given resource for tasks completed in response to requests communicated by the automated agent and in response to requests communicated by other entities in a first time interval; process the first task data to compute a first performance metric reflective of performance of the automated agent relative to the other entities in the first time interval; receive, by way of the communication interface, second task data including values of the given resource for tasks completed in response to requests by the automated agent and in response to requests by other entities in a second time interval; process the second task data to compute a second performance metric reflective of performance of the automated agent relative to the other entities in the second time interval; compute a reward for the reinforcement learning neural network that reflects a difference between the second performance metric and the first performance metric; and provide the reward to the reinforcement learning neural network of the automated agent to train the automated agent.

In accordance with another aspect, there is provided a computer-implemented method of training an automated agent. The method includes instantiating an automated agent that maintains a reinforcement learning neural network and generates, according to outputs of the reinforcement learning neural network, signals for communicating resource task requests; receiving, by way of the communication interface, first task data including values of a given resource for tasks completed in response to requests communicated by the automated agent and in response to requests communicated by other entities in a first time interval; processing the first task data to compute a first performance metric reflective of performance of the automated agent relative to the other entities in the first time interval; receiving, by way of the communication interface, second task data including values of the given resource for tasks completed in response to requests by the automated agent and in response to requests by other entities in a second time interval; processing the second task data to compute a second performance metric reflective of performance of the automated agent relative to the other entities in the second time interval; computing a reward for the reinforcement learning neural network that reflects a difference between the second performance metric and the first performance metric; and providing the reward to the reinforcement learning neural network of the automated agent to train the automated agent.

In accordance with yet another aspect, there is provided a non-transitory computer-readable storage medium storing instructions. The instructions, when executed, adapt at least one computing device to: instantiate an automated agent that maintains a reinforcement learning neural network and generates, according to outputs of the reinforcement learning neural network, signals for communicating resource task requests; receive, by way of the communication interface, first task data including values of a given resource for tasks completed in response to requests communicated by the automated agent and in response to requests communicated by other entities, respectively, in a first time interval; process the first task data to compute a first performance metric reflective of performance of the automated agent relative to the other entities in the first time interval; receive, by way of the communication interface, second task data including values of the given resource for tasks completed in response to requests by the automated agent and in response to requests by other entities, respectively, in a second time interval; process the second task data to compute a second performance metric reflective of performance of the automated agent relative to the other entities in the second time interval; compute a reward for the reinforcement learning neural network that reflects a difference between the second performance metric and the first performance metric; and provide the reward to the reinforcement learning neural network of the automated agent to train the automated agent.

In accordance with another aspect, there is provided a trade execution platform integrating a reinforcement learning process.

In accordance with another aspect, there is provided a reward system having data storage storing a reinforcement learning network for receiving input data to generate output data, the input data representing a trade order; a processor configured with machine executable instructions to train the reinforcement learning network based on good signals and bad signals to minimize Volume Weighted Average Price slippage.

In accordance with another aspect, there is provided a process for reward normalization for provision to a reinforcement learning network comprising: at a processor, processing input data to generate Volume Weighted Average Price data, the input data representing a parent trade order; computing reward data using the Volume Weighted Average Price data, the reward data; computing output data by processing the reward data using the reinforcement learning network.

In some embodiments, the process involves transmitting trade instructions for a plurality of child trade order slices based on the generated output data.

In some embodiments, the process involves generating the Volume Weighted Average Price further by: for each of a plurality of child trade order slices generated by segmenting the input data representing the parent trade order, computing an average price for the respective child trade order slide weighted by a volume.

In some embodiments, the process involves generating a normalized Volume Weighted Average Price by computing a difference between the Volume Weighted Average Price and a market Volume Weighted Average Price and dividing the difference by a market average spread, wherein the normalized Volume Weighted Average Price is for provision to the reinforcement learning network to generate the output data.

In some embodiments, the process involves generating the reward data by computing distribution of mean values of differences of a plurality of Volume Weighted Average Price data values computed for a corresponding plurality of child trade order slices generated by segmenting the input data representing the parent trade order.

In some embodiments, the process involves generating the reward data by normalizing the differences of the plurality of Volume Weighted Average Price data values using a mean and a standard deviation of the distribution.

In accordance with another aspect, there is provided a process for input normalization for training a reinforcement learning network involving: at a processor, processing input data to compute pricing features, volume features, time features, Volume Weighted Average Price features, market spread features, the input data representing a trade order; and training the reinforcement learning network using the pricing features, the volume features, the time features, the Volume Weighted Average Price features, and the market spread features.

In some embodiments, the pricing features can be price comparison features, passive price features, gap features, and aggressive price features.

In some embodiments, the process involves computing upper bounds, lower bounds, and a bounds satisfaction ratio; and training the reinforcement learning network using the upper bounds, the lower bounds, and the bounds satisfaction ratio.

In some embodiments, the process involves computing a normalized order count; and training the reinforcement learning network using the normalized order count.

In some embodiments, the process involves computing a normalized market quote and a normalized market trade; and training the reinforcement learning network using the normalized market quote and the normalized market trade.

In some embodiments, the market spread features are spread averages computed over different time frames.

In some embodiments, the Volume Weighted Average Price features are current Volume Weighted Average Price features and quoted Volume Weighted Average Price features.

In some embodiments, the volume features are a total volume of an order, a ratio of volume remaining for order execution, and schedule satisfaction.

In some embodiments, the time features are current time of market, a ratio of time remaining for order execution, and a ratio of order duration and trading period length.

In accordance with another aspect, there is provided a platform having: data storage storing a reinforcement learning network for receiving input data to generate output data, the input data representing a trade order; a processor configured with machine executable instructions to provide a scheduler configured to follow a historical Volume Weighted Average Price curve to control the reinforcement learning network within schedule satisfaction bounds computed using order volume and order duration.

In accordance with an aspect, there is provided a computer-implemented method of training an automated agent. The method includes: instantiating an automated agent that maintains a reinforcement learning neural network and generates, according to outputs of said reinforcement learning neural network, signals for communicating resource task requests; receiving, by way of said communication interface, first task data including values of a given resource for tasks completed in response to requests communicated by said automated agent and in response to requests communicated by other entities in a first time interval; processing said first task data to compute a first performance metric reflective of performance of said automated agent relative to said other entities for said first time interval; computing a reward for the reinforcement learning neural network that reflects a difference between said first performance metric and a second performance metric reflective of performance of said other entities, wherein computing the reward is based on a difference between a volume-weighted average price (VWAP) for said automated agent for the first time interval and a market VWAP for the first time interval; and providing said reward to the reinforcement learning neural network of said automated agent to train said automated agent.

In accordance with an aspect, there is provided a computer-implemented system for training an automated agent. The system includes: a communication interface; at least one processor; memory in communication with said at least one processor; software code stored in said memory. The software code when executed at said at least one processor causes said system to: instantiate an automated agent that maintains a reinforcement learning neural network and generates, according to outputs of said reinforcement learning neural network, signals for communicating resource task requests; receive, by way of said communication interface, first task data including values of a given resource for tasks completed in response to requests communicated by said automated agent and in response to requests communicated by other entities for a first time interval; process said first task data to compute a first performance metric reflective of performance of said automated agent relative to said other entities in said first time interval; compute a reward for the reinforcement learning neural network that reflects a difference between said first performance metric and a second performance metric reflective of performance of said other entities, wherein computing the reward is based on a difference between a volume-weighted average price (VWAP) for said automated agent for the first time interval and a market VWAP for the first time interval; and provide said reward to the reinforcement learning neural network of said automated agent to train said automated agent.

In accordance with an aspect, there is provided a non-transitory computer-readable storage medium storing instructions which when executed adapt at least one computing device to: instantiate an automated agent that maintains a reinforcement learning neural network and generates, according to outputs of said reinforcement learning neural network, signals for communicating resource task requests; receive, by way of said communication interface, first task data including values of a given resource for tasks completed in response to requests communicated by said automated agent and in response to requests communicated by other entities for a first time interval; process said first task data to compute a first performance metric reflective of performance of said automated agent relative to said other entities in said first time interval; compute a reward for the reinforcement learning neural network that reflects a difference between said first performance metric and a second performance metric reflective of performance of said other entities, wherein computing the reward is based on a difference between a volume-weighted average price (VWAP) for said automated agent for the first time interval and a market VWAP for the first time interval; and provide said reward to the reinforcement learning neural network of said automated agent to train said automated agent.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, which illustrate example embodiments.

DETAILED DESCRIPTION

Figure 1A:
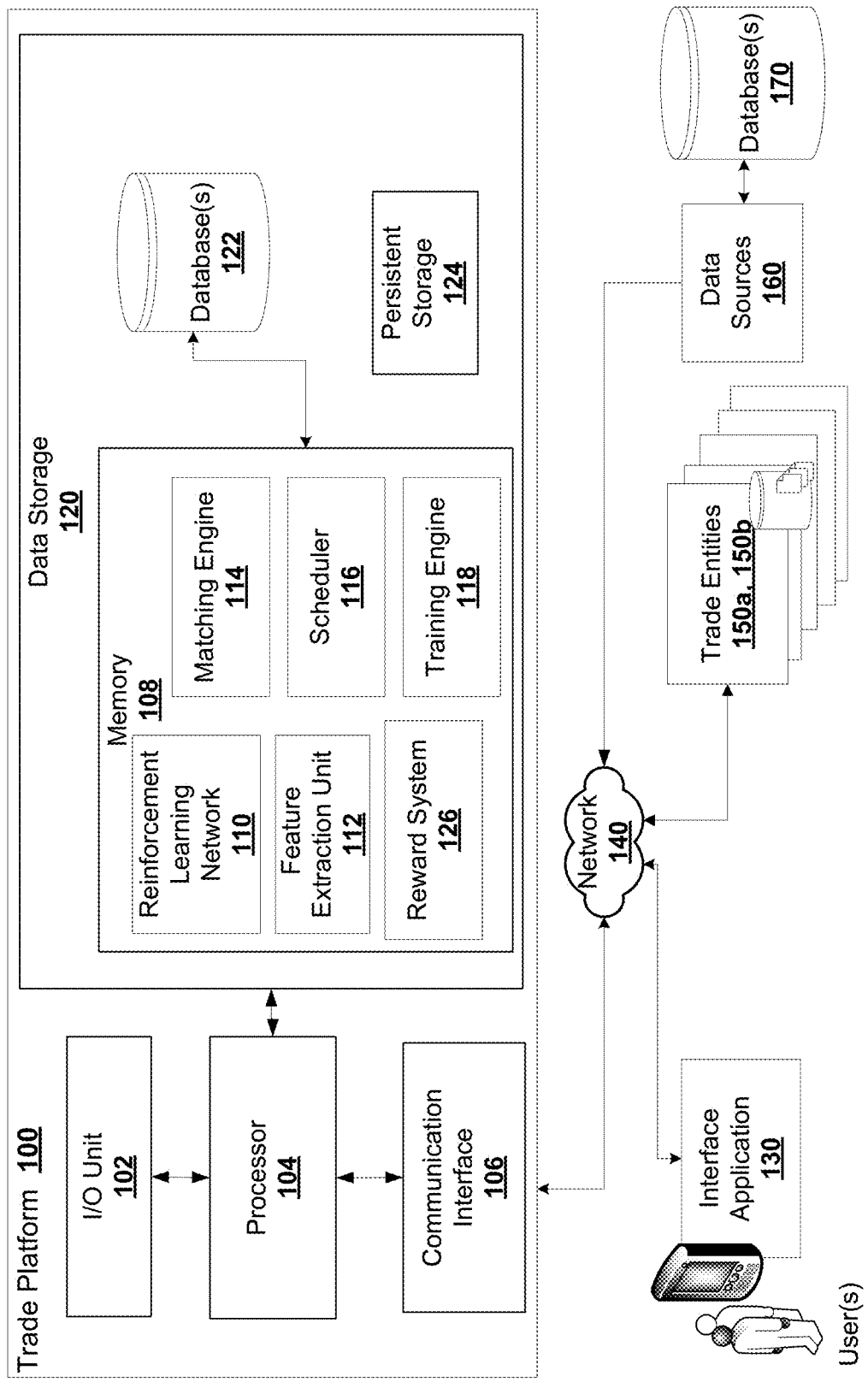
FIG. 1A is a schematic diagram of a computer-implemented system for training an automated agent, exemplary of embodiments.

FIG. 1A is a high-level schematic diagram of a computer-implemented system 100 for training an automated agent having a neural network, exemplary of embodiments. The automated agent is instantiated and trained by system 100 in manners disclosed herein to generate task requests.

As detailed herein, in some embodiments, system 100 includes features adapting it to perform certain specialized purposes, e.g., to function as a trading platform. In such embodiments, system 100 may be referred to as trading platform 100 or simply as platform 100 for convenience. In such embodiments, the automated agent may generate requests for tasks to be performed in relation to securities (e.g., stocks, bonds, options or other negotiable financial instruments). For example, the automated agent may generate requests to trade (e.g., buy and/or sell) securities by way of a trading venue.

Referring now to the embodiment depicted in FIG. 1A, trading platform 100 has data storage 120 storing a model for a reinforcement learning neural network. The model is used by trading platform 100 to instantiate one or more automated agents 180 (FIG. 1B) that each maintain a reinforcement learning neural network 110 (which may be referred to as a reinforcement learning network 110 or network 110 for convenience).

A processor 104 is configured to execute machine-executable instructions to train a reinforcement learning network 110 based on a reward system 126. The reward system generates good signals and bad signals to train automated agents 180 to perform desired tasks more optimally, e.g., to minimize and maximize certain performance metrics. In some embodiments, an automated agent 180 may be trained by way of signals generated in accordance with reward system 126 to minimize Volume Weighted Average Price slippage.

The trading platform 100 can implement a reward normalization process for computing reward data for the reinforcement learning network 110 using Volume Weighted Average Price data. For example, the trading platform 100 can generate a normalized Volume Weighted Average Price by computing a difference between the Volume Weighted Average Price and a market Volume Weighted Average Price and dividing the difference by a market average spread. In some embodiments, trading platform 100 can generate reward data by normalizing the differences of the plurality of Volume Weighted Average Price data values using a mean and a standard deviation of the distribution.

In some embodiments, trading platform 100 can normalize input data for training the reinforcement learning network 110. The input normalization process can involve a feature extraction unit 112 processing input data to generate different features such as pricing features, volume features, time features, Volume Weighted Average Price features, market spread features. The pricing features can be price comparison features, passive price features, gap features, and aggressive price features. The market spread features can be spread averages computed over different time frames. The Volume Weighted Average Price features can be current Volume Weighted Average Price features and quoted Volume Weighted Average Price features. The volume features can be a total volume of an order, a ratio of volume remaining for order execution, and schedule satisfaction. The time features can be current time of market, a ratio of time remaining for order execution, and a ratio of order duration and trading period length.

The input normalization process can involve computing upper bounds, lower bounds, and a bounds satisfaction ratio; and training the reinforcement learning network using the upper bounds, the lower bounds, and the bounds satisfaction ratio. The input normalization process can involve computing a normalized order count, a normalized market quote and/or a normalized market trade. The platform 100 can have a scheduler 116 configured to follow a historical Volume Weighted Average Price curve to control the reinforcement learning network 110 within schedule satisfaction bounds computed using order volume and order duration.

The platform 100 can connect to an interface application 130 installed on user device to receive input data. Trade entities 150a, 150b can interact with the platform to receive output data and provide input data. The trade entities 150a, 150b can have at least one computing device. The platform 100 can train one or more reinforcement learning neural networks 110. The trained reinforcement learning networks 110 can be used by platform 100 or can be for transmission to trade entities 150a, 150b, in some embodiments. The platform 100 can process trade orders using the reinforcement learning network 110 in response to commands from trade entities 150a, 150b, in some embodiments.

The platform 100 can connect to different data sources 160 and databases 170 to receive input data and receive output data for storage. The input data can represent trade orders. Network 140 (or multiple networks) is capable of carrying data and can involve wired connections, wireless connections, or a combination thereof. Network 140 may involve different network communication technologies, standards and protocols, for example.

The platform 100 can include an I/O unit 102, a processor 104, communication interface 106, and data storage 120. The I/O unit 102 can enable the platform 100 to interconnect with one or more input devices, such as a keyboard, mouse, camera, touch screen and a microphone, and/or with one or more output devices such as a display screen and a speaker.

The processor 104 can execute instructions in memory 108 to implement aspects of processes described herein. The processor 104 can execute instructions in memory 108 to configure a data collection unit, interface unit (to provide control commands to interface application 130), reinforcement learning network 110, feature extraction unit 112, matching engine 114, scheduler 116, training engine 118, reward system 126, and other functions described herein. The processor 104 can be, for example, any type of general-purpose microprocessor or microcontroller, a digital signal processing (DSP) processor, an integrated circuit, a field programmable gate array (FPGA), a reconfigurable processor, or any combination thereof.

Figure 1B:
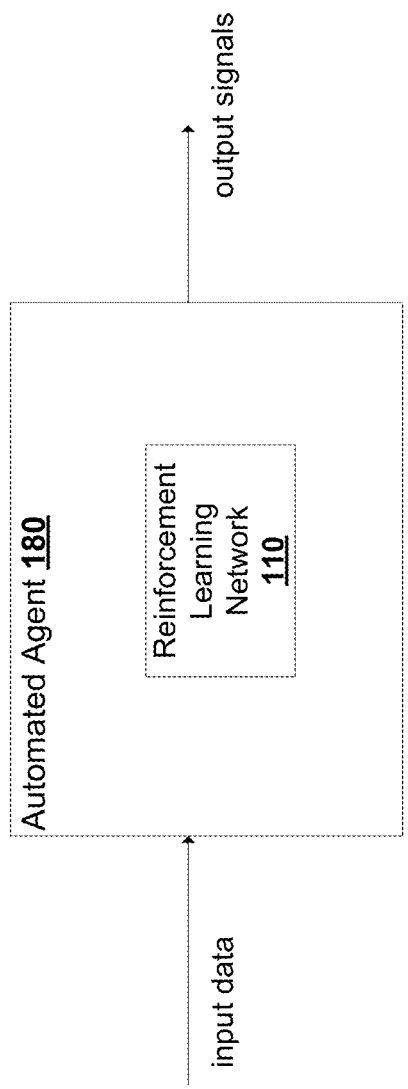
FIG. 1B is a schematic diagram of an automated agent, exemplary of embodiments.

As depicted in FIG. 1B, automated agent 180 receives input data (via a data collection unit) and generates output signal according to its reinforcement learning network 110 for provision to trade entities 150a, 150b. Reinforcement learning network 110 can refer to a neural network that implements reinforcement learning.

Figure 2:
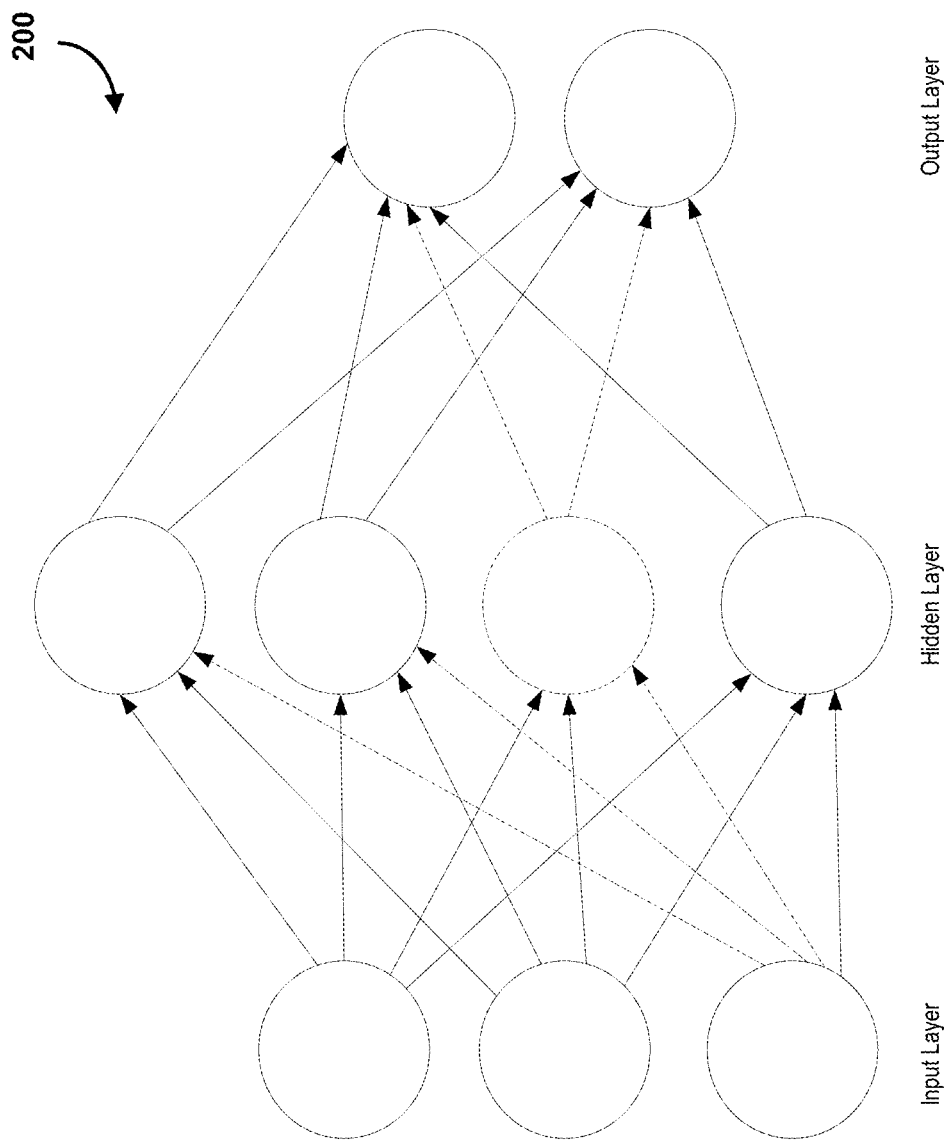
FIG. 2 is a schematic diagram of an example neural network maintained at the computer-implemented system of FIG. 1A.

FIG. 2 is a schematic diagram of an example neural network 200 according to some embodiments. The example neural network 200 can include an input layer, a hidden layer, and an output layer. The neural network 200 processes input data using its layers based on reinforcement learning, for example.

Reinforcement learning is a category of machine learning that configures agents, such the automated agents 180 described herein, to take actions in an environment to maximize a notion of a reward. The processor 104 is configured with machine executable instructions to instantiate an automated agent 180 that maintains a reinforcement learning neural network 110 (also referred to as a reinforcement learning network 110 for convenience), and to train the reinforcement learning network 110 of the automated agent 180 using a training unit 118. The processor 104 is configured to use the reward system 126 in relation to the reinforcement learning network 110 actions to generate good signals and bad signals for feedback to the reinforcement learning network 110. In some embodiments, the reward system 126 generates good signals and bad signals to minimize Volume Weighted Average Price slippage, for example. Reward system 126 is configured to receive control the reinforcement learning network 110 to process input data in order to generate output signals. Input data may include trade orders, various feedback data (e.g., rewards), or feature selection data, or data reflective of completed tasks (e.g., executed trades), data reflective of trading schedules, etc. Output signals may include signals for communicating resource task requests, e.g., a request to trade in a certain security. For convenience, a good signal may be referred to as a "positive reward" or simply as a reward, and a bad signal may be referred as a "negative reward" or as a "punishment.

Referring again to FIG. 1, feature extraction unit 112 is configured to process input data to compute a variety of features. The input data can represent a trade order. Example features include pricing features, volume features, time features, Volume Weighted Average Price features, market spread features.

Matching engine 114 is configured to implement a training exchange defined by liquidity, counter parties, market makers and exchange rules. The matching engine 114 can be a highly performant stock market simulation environment designed to provide rich datasets and ever changing experiences to reinforcement learning networks 110 (e.g. of agents 180) in order to accelerate and improve their learning. The processor 104 may be configured to provide a liquidity filter to process the received input data for provision to the machine engine 114, for example. In some embodiments, matching engine 114 may be implemented in manners substantially as described in U.S. patent application Ser. No. 16/423,082, the entire contents of which are hereby incorporated herein.

Scheduler 116 is configured to follow a historical Volume Weighted Average Price curve to control the reinforcement learning network 110 within schedule satisfaction bounds computed using order volume and order duration.

The interface unit 130 interacts with the trading platform 100 to exchange data (including control commands) and generates visual elements for display at user device. The visual elements can represent reinforcement learning networks 110 and output generated by reinforcement learning networks 110.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 120 can include memory 108, databases 122, and persistent storage 124.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 may serve multiple users which may operate trade entities 150a, 150b.

The data storage 120 may be configured to store information associated with or created by the components in memory 108 and may also include machine executable instructions. The data storage 120 includes a persistent storage 124 which may involve various types of storage technologies, such as solid state drives, hard disk drives, flash memory, and may be stored in various formats, such as relational databases, non-relational databases, flat files, spreadsheets, extended markup files, etc.

Reward System

A reward system 126 integrates with the reinforcement learning network 110, dictating what constitutes good and bad results within the environment. Reward system 126 is primarily based around a common metric in trade execution called the Volume Weighted Average Price ("VWAP"). The reward system 126 can implement a process in which VWAP is normalized and converted into the reward that is fed into models of reinforcement learning networks 110. The reinforcement learning network 110 processes one large order at a time, denoted a parent order (i.e. Buy 10000 shares of RY.TO), and places orders on the live market in small child slices (i.e. Buy 100 shares of RY.TO @ 110.00). A reward can be calculated on the parent order level (i.e. no metrics are shared across multiple parent orders that the reinforcement learning network 110 may be processing concurrently) in some embodiments.

To achieve proper learning, the reinforcement learning network 110 is configured with the ability to automatically learn based on good and bad signals. To teach the reinforcement learning network 110 how to minimize VWAP slippage, the reward system 126 provides good and bad signals to minimize VWAP slippage.

Reward Normalization

The reward system 126 can normalize the reward for provision to the reinforcement learning network 110. The processor 104 is configured to use the reward system 126 to process input data to generate Volume Weighted Average Price data. The input data can represent a parent trade order. The reward system 126 can compute reward data using the Volume Weighted Average Price and compute output data by processing the reward data using the reinforcement learning network 110. In some embodiments, reward normalization may involve transmitting trade instructions for a plurality of child trade order slices based on the generated output data.

In some embodiments, reward system 126 generates the Volume Weighted Average Price for reward normalization. For example, the reward system 126 can generate the Volume Weighted Average Price by, for each of a plurality of child trade order slices generated by segmenting the input data representing the parent trade order, computing an average price for the respective child trade order slide weighted by a volume.

In some embodiments, reward system 126 can implement reward normalization by generating a normalized Volume Weighted Average Price by computing a difference between the Volume Weighted Average Price and a market Volume Weighted Average Price and dividing the difference by a market average spread. The normalized Volume Weighted Average Price can be for provision to the reinforcement learning network 110 to generate the output data.

In some embodiments, reward system 126 cam implement reward normalization by generating the reward data by computing distribution of mean values of differences of a plurality of Volume Weighted Average Price data values computed for a corresponding plurality of child trade order slices generated by segmenting the input data representing the parent trade order.

In some embodiments, reward system 126 can implement reward normalization by generating the reward data by normalizing the differences of the plurality of Volume Weighted Average Price data values using a mean and a standard deviation of the distribution.

The reward system 126 can compute different Volume Weighted Average Price data values or metrics for reward normalization.

Figure 3:
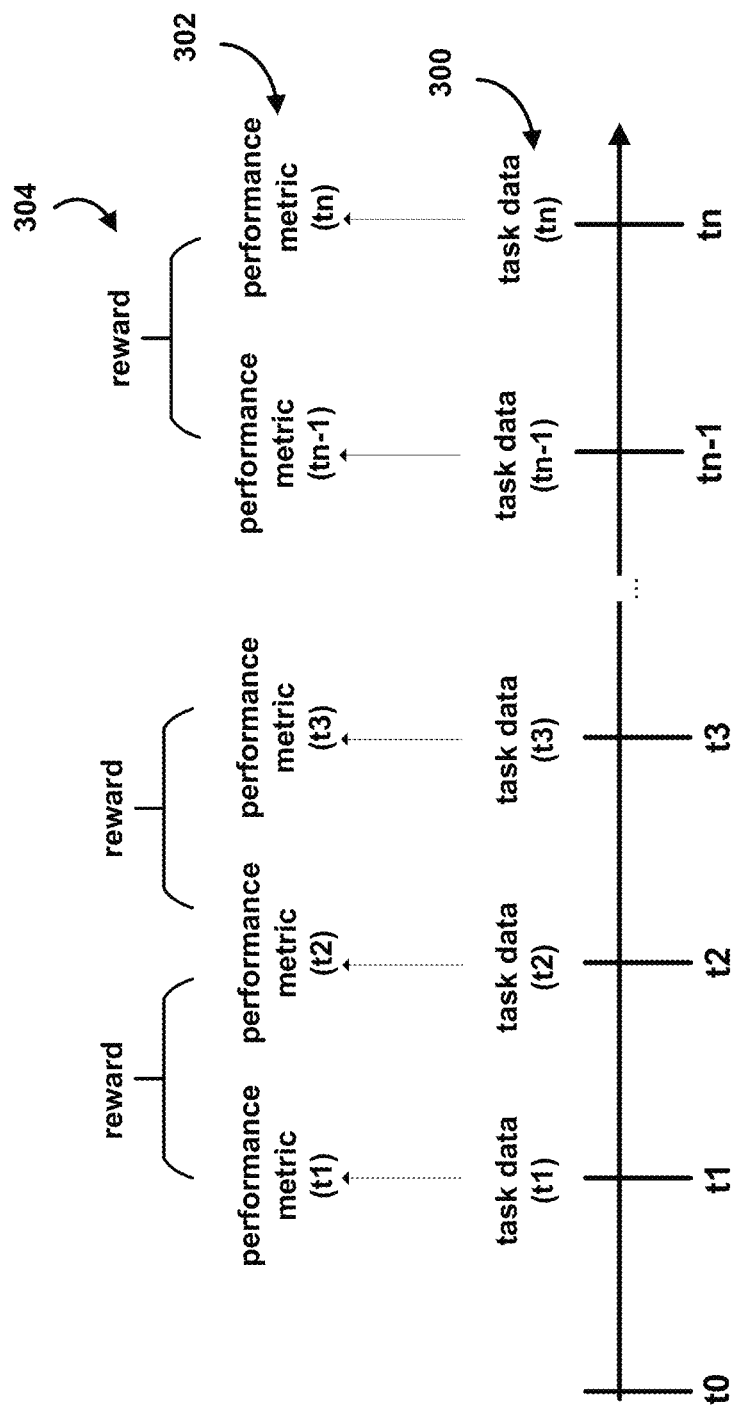
FIG. 3 is a schematic diagram showing the calculation of performance metrics and rewards for training the neural network of FIG. 2 across successive process steps.

FIG. 3 illustrates the calculation of rewards by reward system 126 at successive process steps, which may also referred to as time steps given the progression of time across process steps. As depicted, at each time step ($t_0, t_1, \ldots t_n$), platform 100 receives task data 300, e.g., directly from a trading venue or indirectly by way of an intermediary. Task data 300 includes data relating to tasks completed in a given time interval (e.g., $t_0$ to $t_1$, $t_1$ to $t_2$, ..., $t_{n-1}$ to $t_n$) in connection with a given resource. For example, tasks may include trades of a given security in the time interval. In this circumstance, task data includes values of the given security such as prices and volumes of trades. In the depicted embodiment, task data includes values for prices and volumes across a plurality of child slices. In this embodiment, task data includes values for prices and volumes for tasks completed in response to requests communicated by an automated agent 180 and for tasks completed in response to requests by other entities (e.g., the rest of the market). Such other entities may include, for example, other automated agents 180 or human traders.

At each time step, reward system 126 processes the received task data 300 to calculate performance metrics 302 that measure the performance of an automated agent 180, e.g., in the prior time interval. In some embodiments, performance metrics 302 measure the performance of an automated agent 180 relative to the market (i.e., including the aforementioned other entities). In some embodiments, performance metric 302 includes $VWAP_{algo}$, which may be calculated in manners detailed below.

In some embodiments, each time interval (i.e., time between each of $t_0$ to $t_1$, $t_1$ to $t_2$, ..., $t_{n-1}$ to $t_n$) is substantially less than one day. In one particular embodiment, each time interval has a duration between 0-6 hours. In one particular embodiment, each time interval has a duration less than 1 hour. In one particular embodiment, a median duration of the time intervals is less than 1 hour. In one particular embodiment, a median duration of the time intervals is less than 1 minute. In one particular embodiment, a median duration of the time interval is less than 1 second.

As will be appreciated, having a time interval substantially less than one day provides opportunity for automated agents 180 to learn and change how task requests are generated over the course of a day. In some embodiments, the duration of the time interval may be adjusted in dependence on the volume of trade activity for a given trade venue. In some embodiments, duration of the time interval may be adjusted in dependence on the volume of trade activity for a given resource.

Calculating $VWAP_{algo}$:

The reward system 126 can compute reward data using "volume weighted average price" metrics. For example, to compute the VWAP of the reinforcement learning network 110 executions, reward system 126 can compute the average price across all of the completed child slices for a given parent order, weighted by their volume. In some embodiments, reward system 126 can compute the average price using Eq. 1. The reward system 126 computes cumulative price. Cumulative price is updated at every time step taken in the environment in some embodiments. This is used by reward system 126 for calculating $VWAP_{algo}$ (volume weighted average price) in the calculation of normalized VWAP.

$$VWAP_{algo}(t_n) = \frac{\sum_{i=1}^{n} volume_{filled}(t_i) \times price_{filled\ at}}{\sum_{i=1}^{n} volume_{filled}(t_i)} \quad \text{Eq.1}$$

Calculating Normalized VWAP:

To normalize the VWAP metric, reward system 126 can compute the difference between the reinforcement learning network 110 VWAP ($VWAP_{algo}$) and the market VWAP ($VWAP_{market}$) as a measure of the reinforcement learning network 110 relative performance. This number is divided by the market average spread ($spread_{market\ average}$) as a way to normalize any inter-stock differences. In some embodiments, reward system 126 can normalize the VWAP metric according to the following example equation:

$$VWAP_{normalized} = \frac{VWAP_{algo} - VWAP_{market}}{spread_{market\ average}} \quad \text{Eq.2}$$

For this example equation $spread_{market\ average}$ refers to market average spread; $VWAP_{market}$ refers to market VWAP; and $t_n$ has been omitted for simplicity but may be used in some embodiments. Otherwise each variable is taken at time step n ($t_n$).

Referring again to FIG. 3, reward system 126 processes performance metrics 302 to calculate rewards 304.

Calculating Reward:

To compute the final reward, reward system 126 can compute the difference between the normalized VWAP metric ($VWAP_{normalized}$) across successive steps (delta VWAP or ΔVWAP). The reward system 126 can record a running mean of delta VWAP's that the reinforcement learning network 110 has achieved, and constructs a distribution over their values. The reward system 126 computes the final reward by normalizing the delta VWAP using the mean and standard deviation of that distribution. Any value that exceeds a score of 1 (1 standard deviation better than average performance) is given a reward of 0.1, and conversely any score of −1 (1 standard deviation worse than the average performance) is given a reward of −0.1. Any score that falls within that range of 1 and −1 (standard deviation) is returned divided by 10. In some embodiments, reward system 126 can compute the reward according to the following example equations:

$$\Delta_{VWAP} = VWAP_{normalized}(t_{n-1}) - VWAP_{normalized}(t_n) \quad \text{Eq.3}$$

$$reward = \frac{\text{CLIP}\left[\frac{\Delta_{VWAP} - \mu_{\Delta_{VWAP}}}{\sigma_{\Delta_{VWAP}}}, \{-1, 1\}\right]}{10} \quad \text{Eq.4}$$

Figure 4:
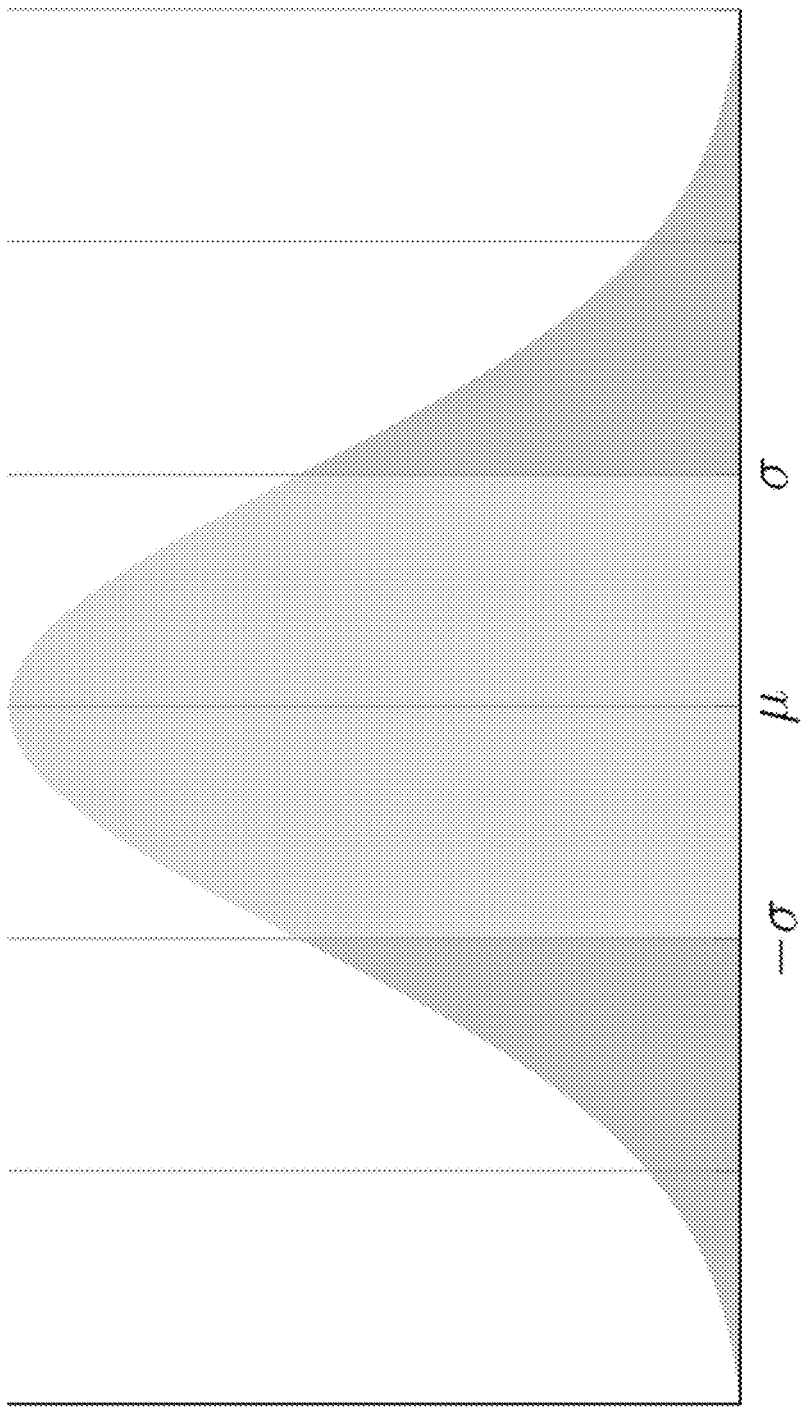
FIG. 4 is a graph of the distribution of an example performance metric across successive process steps, exemplary of embodiments.

FIG. 4 is a graph of the distribution of delta VWAP, i.e., difference between normalized Volume Weighted Average Price across successive process steps.

Reward Check:

Another aspect of the reward system 126 is to implement a punishment process if the model of the reinforcement learning network 110 falls significantly behind or ahead of the execution schedule. The execution schedule can be a guide for how much volume the reinforcement learning network 110 should have executed at specific points in the course of its duration. The duration can be the amount of time assigned to the reinforcement learning network 110 of an automated agent 180 to complete the order. When the model has executed outside of its discretionary bounds (a wide range around the execution schedule), a reward of −1 is assigned by reward system 126, which can supersede any reward calculated through the aforementioned reward process.

In some embodiments, data storage 120 may store a task completion schedule, and platform 100 detects when this task schedule as not been followed within pre-defined tolerances, e.g., upon processing some task data 300. Upon such detection, platform 100 applies a punishment to reinforcement learning network 110.

In some embodiments, the reward function and reward metrics may be based on a portion or variant of the above equations or alternative equation(s). For example, in some embodiments, the reward function may be based on $VWAP_{algo}$–$VWAP_{market}$. For a particular time interval $t_n$, the reward function will then depend on a difference between the $VWAP_{algo}$ (calculated using Equation 1 and tasks from time t=0 to $t_n$) and the $VWAP_{market}$ based on tasks from time t=0 to $t_n$. In some scenarios, this may provide a simpler metric which still provides better granularity than comparing VWAPs at the end of the day (i.e. an example trading/evaluation period). In some embodiments, the reward metric can be calculated to treat all time intervals before the current time interval as a day, and calculating VWAPs based on the closing and/or other prices based on this previous time interval "day" which actually only represents a portion of a day.

Input Normalization (Normalization of Features of the State)

In the interest of improving the stability, and efficacy of the reinforcement learning network 110 model training, then platform 100 can normalize the inputs, or state, of the reinforcement learning network 110 model in a number of ways. The platform 100 can implement different processes to normalize the state space. Normalization can transform input data into a range or format that is understandable by the model or reinforcement learning network 110.

Neural networks have very a range of values that inputs have to be in for the neural network to be effective. Input normalization can refer to scaling or transforming input values for provision to neural networks. For example, in some machine learning processes the max/min values can be predefined (pixel values in images) or a computed mean and standard deviation can be used, then the input values to mean 0 and standard deviation of 1 can be converted. In trading, this approach might not work. The mean or the standard deviation of the inputs, can be computed from historical values. However, this may not be the best way to normalize, as the mean or standard deviation can change as the market changes. The platform 100 can address this challenge in a number of different ways for the input space.

The training engine 118 can normalize the input data for training the reinforcement learning network 110. The processor 104 is configured for processing input data to compute different features. Example features include pricing features, volume features, time features, Volume Weighted Average Price features, market spread features, and so on. The input data represents a trade order for processing by reinforcement learning network 110. The processor 104 is configured to train reinforcement learning network 110 with the training engine 118 using the pricing features, volume features, time features, Volume Weighted Average Price features and market spread features.

The operation of system 100 is further described with reference to the flowchart illustrated in FIG. 5, exemplary of embodiments.

Figure 5:
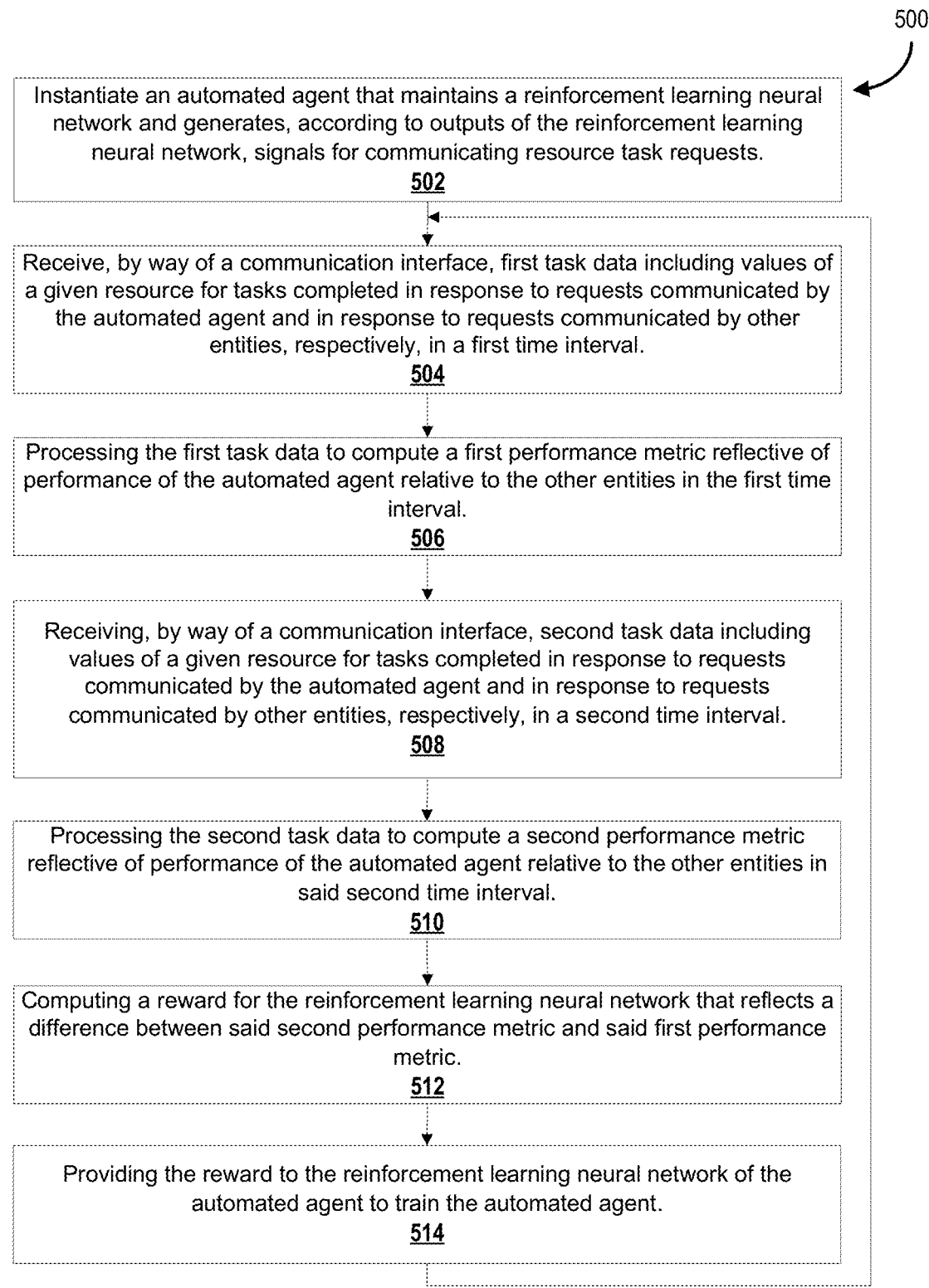
FIG. 5 is a flowchart of an example method of training an automated agent, exemplary of embodiments.

As depicted in FIG. 5, trading platform 100 performs blocks 500 and onward to train an automated agent 180. At block 502, platform 100 instantiates an automated agent 180 that maintains a reinforcement learning neural network 110, e.g., using data descriptive of the neural network stored in data storage 120. The automated agent 180 generates, according to outputs of its reinforcement learning neural network, signals for communicating resource task requests for a given resource (e.g., a given security). For example, the automated agent 180 may receive a trade order for a given security as input data and then generate signals for a plurality of resource task requests corresponding to trades for child trade order slices of that security. Such signals may be communicated to a trading venue by way of communication interface 106.

At block 504, platform 100 receives, by way of communication interface 106, first task data 300 including values of a given resource for tasks completed in a first time interval (e.g., $t_0$ to $t_1$ in FIG. 3). These completed tasks include completed trades in the given resource (e.g., a given security), and the values included in first task data 300 include values for prices and volumes for the completed trades. The completed tasks include trades completed in response to requests communicated by the automated agent 180 of platform 100 and trades completed by other market entities, i.e., in response to requests communicated by such other entities.

At block 506, platform 100 processes first task data 300 to compute a first performance metric 302, reflective of the performance of the automated agent 180 relative to other market entities in the first time interval. For example, first performance metric 302 may be computed by computing VWAP for trades of the given security completed in the first time interval in response to requests communicated by the automated agent 180 and computing VWAP for trades completed in the first time interval by the market as a whole (i.e., all entities). In such cases, first performance metric 302 may reflect a difference between VWAP for trades of the given security completed in response to requests communicated by the automated agent 180 and VWAP for trades completed by the market (i.e., all entities). In some embodiments, processing first task data 300 includes computing an un-normalized performance metric and normalizing the performance metric in manners disclosed herein, e.g., using an average spread for the given security.

At block 508, platform 100 receives, by way of communication interface 106, second task data 300 including values of a given resource for tasks completed in a second time interval (e.g., $t_1$ to $t_2$ in FIG. 3). These completed tasks include completed trades in the given resource (e.g., a given security), and the values included in second task data 300 include values for prices and volumes for the completed trades. The completed tasks include trades completed in response to requests communicated by the automated agent 180 and trades completed by other market entities, i.e., in response to requests communicated by such other entities.

At block 510, platform 100 processes second task data 300 to compute a second performance metric 302, reflective of the performance of the automated agent 180 relative to other entities in the second time interval. For example, second performance metric 302 for the second time interval may be computed in manners substantially similar to those described with reference to first performance metric 302 for the first time interval, e.g., by computing VWAP for trades of the given security completed in the second time interval in response to requests communicated by the automated agent 180 and computing VWAP for trades of the given security completed in the second time interval by the market (i.e., all entities).

At block 512, platform 100 computes a reward 304 for the reinforcement learning neural network that reflects a difference between second performance metric 302 computed at block 510 and first performance metric 302 computed at block 506. In some embodiments, computing reward 304 includes obtaining a plurality of delta VWAPs, each delta VWAP reflecting a difference in VWAP computed for successive time intervals, and also computing a mean for the delta VWAPs and a standard deviation of the delta VWAPs. In some embodiments, computing reward 304 includes computing an un-normalized reward and normalizing the un-normalized reward using the calculated mean and standard deviation of the delta VWAPs. In some embodiments, computing reward 304 comprises applying Eq. 4, i.e., which includes calculating $$\frac{\Delta VWAP_{2,1} - \mu \Delta VWAP}{\sigma \Delta VWAP}$$

where $\Delta VWAP2,1$ is a difference between VWAP computed for the second time interval and VWAP computed for the first time interval, $\mu \Delta VWAP$ is the mean of delta VWAPs, and $\sigma \Delta VWAP$ is the standard deviation of delta VWAPs.

At block 514, platform 100 provides reward 304 to reinforcement learning neural network 110 of the automated agent 180 to train the automated agent 180.

Operation may continue by repeating blocks 504 through 514 for successive time intervals, e.g., until trade orders received as input data are completed. For example, platform 100 may receive, by way of the communication interface, third task data 300 including values of the given resource for tasks in a third time interval (e.g., $t_2$ to $t_3$ in FIG. 3), processing third task data 300 to compute a third performance metric 302, computing a further reward 304 for reinforcement learning neural network 110 that reflects a difference between third performance metric 302 and second performance metric 302, and providing further reward 304 to reinforcement learning neural network 110. Blocks 504 through 514 may be further repeated as required. Conveniently, repeated performance of these blocks causes automated agent 180 to become further optimized at making resources task requests, e.g., in some embodiments by improving the price of securities traded, improving the volume of securities traded, improving the timing of securities traded, and/or improving adherence to a desired trading schedule. As will be appreciated, the optimization results will vary from embodiment to embodiment.

Figure 6:
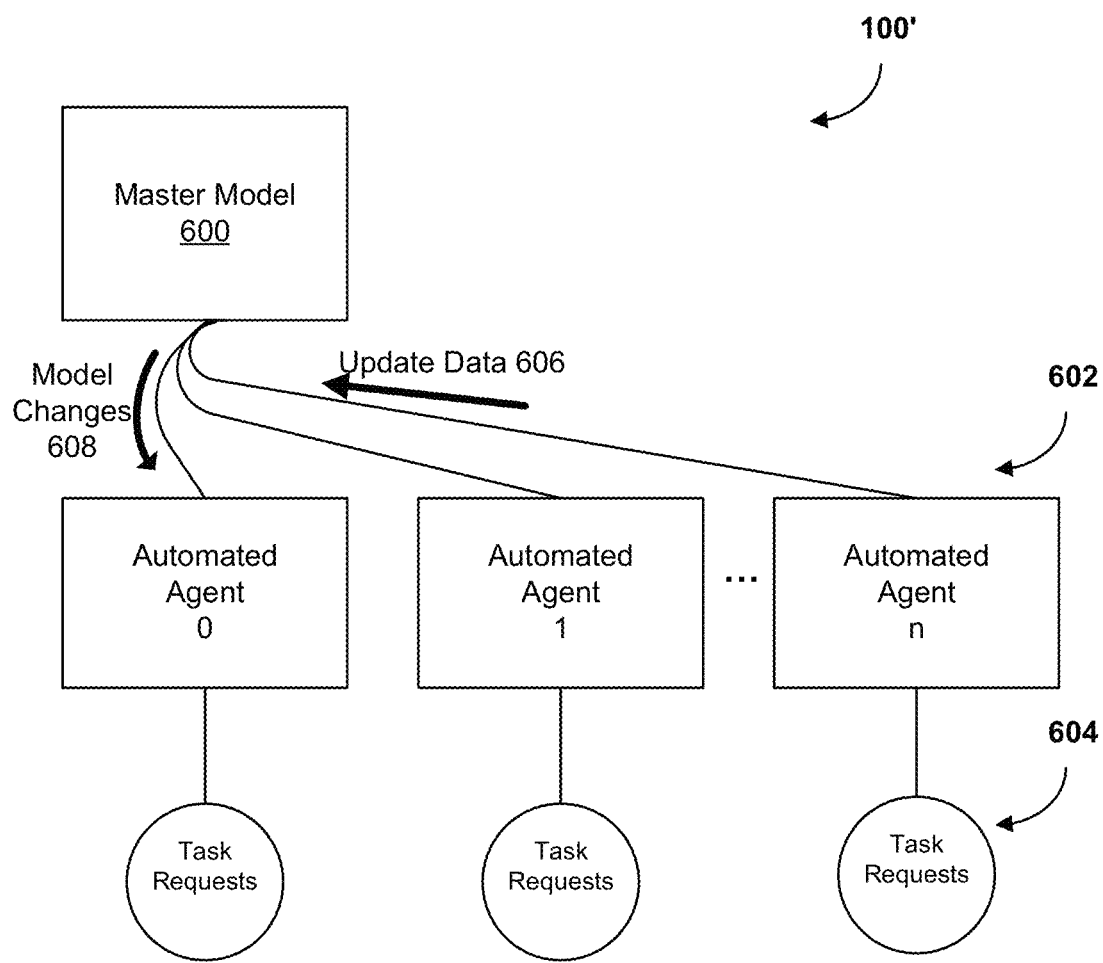
FIG. 6 is a schematic diagram of a system having a plurality of automated agents, exemplary of embodiments.

FIG. 6 depicts an embodiment of platform 100' having a plurality of automated agents 602. In this embodiment, data storage 120 stores a master model 600 that includes data defining a reinforcement learning neural network for instantiating one or more automated agents 602.

During operation, platform 100' instantiates a plurality of automated agents 602 according to master model 600 and performs operations at blocks 500 and onward (FIG. 5) for each automated agent 602. For example, each automated agent 602 generates tasks requests 604 according to outputs of its reinforcement learning neural network 110.

As the automated agents 602 learn during operation, platform 100' obtains update data 606 from one or more of the automated agents 602 reflective of learnings at the automated agents 602. Update data 606 includes data descriptive of an "experience" of an automated agent in generating a task request. Update data 606 may include one or more of: (i) input data to the given automated agent 602 and applied normalizations (ii) a list of possible resource task requests evaluated by the given automated agent with associated probabilities of making each requests, and (iii) one or more rewards for generating a task request.

Platform 100' processes update data 606 to update master model 600 according to the experience of the automated agent 602 providing the update data 606. Consequently, automated agents 602 instantiated thereafter will have benefit of the learnings reflected in update data 606. Platform 100' may also sends model changes 608 to the other automated agents 602 so that these pre-existing automated agents 602 will also have benefit of the learnings reflected in update data 606. In some embodiments, platform 100' sends model changes 608 to automated agents 602 in quasi-real time, e.g., within a few seconds, or within one second. In one specific embodiment, platform 100' sends model changes 608 to automated agents 602 using a stream-processing platform such as Apache Kafka, provided by the Apache Software Foundation. In some embodiments, platform 100' processes update data 606 to optimize expected aggregate reward across based on the experiences of a plurality of automated agents 602.

In some embodiments, platform 100' obtains update data 606 after each time step. In other embodiments, platform 100' obtains update data 606 after a predefined number of time steps, e.g., 2, 5, 10, etc. In some embodiments, platform 100' updates master model 600 upon each receipt update data 606. In other embodiments, platform 100' updates master model 600 upon reaching a predefined number of receipts of update data 606, which may all be from one automated agents 602 or from a plurality of automated agents 602.

In one example, platform 100' instantiates a first automated agent 602 and a second automated agent 602, each from master model 600. Platform 100' obtains update data 606 from the first automated agents 602. Platform 100' modifies master model 600 in response to the update data 606 and then applies a corresponding modification to the second automated agent 602. Of course, the roles of the automated agents 602 could be reversed in another example such that platform 100' obtains update data 606 from the second automated agent 602 and applies a corresponding modification to the first automated agent 602.

In some embodiments of platform 100', an automated agent may be assigned all tasks for a parent order. In other embodiments, two or more automated agent 600 may cooperatively perform tasks for a parent order; for example, child slices may be distributed across the two or more automated agents 602.

In the depicted embodiment, platform 100' may include a plurality of I/O units 102, processors 104, communication interfaces 106, and memories 108 distributed across a plurality of computing devices. In some embodiments, each automated agent may be instantiated and/or operated using a subset of the computing devices. In some embodiments, each automated agent may be instantiated and/or operated using a subset of available processors or other compute resources. Conveniently, this allows tasks to be distributed across available compute resources for parallel execution. Other technical advantages include sharing of certain resources, e.g., data storage of the master model, and efficiencies achieved through load balancing. In some embodiments, number of automated agents 602 may be adjusted dynamically by platform 100'. Such adjustment may depend, for example, on the number of parent orders to be processed. For example, platform 100' may instantiate a plurality of automated agents 602 in response to receive a large parent order, or a large number of parent orders. In some embodiments, the plurality of automated agents 602 may be distributed geographically, e.g., with certain of the automated agent 602 placed for geographic proximity to certain trading venues.

In some embodiments, the operation of platform 100' adheres to a master-worker pattern for parallel processing. In such embodiments, each automated agent 602 may function as a "worker" while platform 100' maintains the "master" by way of master model 600.

Platform 100' is otherwise substantially similar to platform 100 described herein and each automated agent 602 is otherwise substantially similar to automated agent 180 described herein.

Pricing Features:

In some embodiments, input normalization may involve the training engine 118 computing pricing features. In some embodiments, pricing features for input normalization may involve price comparison features, passive price features, gap features, and aggressive price features.

Price Comparing Features:

In some embodiments, price comparison features can capture the difference between the last (most current) Bid/Ask price and the Bid/Ask price recorded at different time intervals, such as 30 minutes and 60 minutes ago: qt_Bid30, qt_Ask30, qt_Bid60, qt_Ask60. A bid price comparison feature can be normalized by the difference of a quote for a last bid/ask and a quote for a bid/ask at a previous time interval which can be divided by the market average spread. The training engine 118 can "clip" the computed values between a defined ranged or clipping bound, such as between −1 and 1, for example. There can be 30 minute differences computed using clipping bound of −5, 5 and division by 10, for example.

An Ask price comparison feature (or difference) can be computed using an Ask price instead of Bid price. For example, there can be 60 minute differences computed using clipping bound of −10, 10 and division by 10.

Passive Price:

The passive price feature can be normalized by dividing a passive price by the market average spread with a clipping bound. The clipping bound can be 0, 1, for example.

Gap:

The gap feature can be normalized by dividing a gap price by the market average spread with a clipping bound. The clipping bound can be 0, 1, for example.

Aggressive Price:

The aggressive price feature can be normalized by dividing an aggressive price by the market average spread with a clipping bound. The clipping bound can be 0, 1, for example.

Volume and Time Features: In some embodiments, input normalization may involve the training engine 118 computing volume features and time features. In some embodiments, volume features for input normalization involves a total volume of an order, a ratio of volume remaining for order execution, and schedule satisfaction. In some embodiments, the time features for input normalization involves current time of market, a ratio of time remaining for order execution, and a ratio of order duration and trading period length.

Ratio of Order Duration and Trading Period Length:

The training engine 118 can compute time features relating to order duration and trading length. The ratio of total order duration and trading period length can be calculated by dividing a total order duration by an approximate trading day or other time period in seconds, minutes, hours, and so on. There may be a clipping bound.

Current Time of the Market:

The training engine 118 can compute time features relating to current time of the market. The current time of the market can be normalized by the different between the current market time and the opening time of the day (which can be a default time), which can be divided by an approximate trading day or other time period in seconds, minutes, hours, and so on.

Total Volume of the Order:

The training engine 118 can compute volume features relating to the total order volume. The training engine 118 can train the reinforcement learning network 110 using the normalized order count. The total volume of the order can be normalized by dividing the total volume by a scaling factor (which can be a default value).

Ratio of Time Remaining for Order Execution:

The training engine 118 can compute time features relating to the time remaining for order execution. The ratio of time remaining for order execution can be calculated by dividing the remaining order duration by the total order duration. There may be a clipping bound.

Ratio of Volume Remaining for Order Execution:

The training engine 118 can compute volume features relating to the remaining order volume. The ratio of volume remaining for order execution can be calculated by dividing the remaining volume by the total volume. There may be a clipping bound.

Schedule Satisfaction:

The training engine 118 can compute volume and time features relating to schedule satisfaction features. This can give the model a sense of how much time it has left compared to how much volume it has left. This is an estimate of how much time is left for order execution. A schedule satisfaction feature can be computed the a different of the remaining volume divided by the total volume and the remaining order duration divided by the total order duration. There may be a clipping bound.

VWAPs Features

In some embodiments, input normalization may involve the training engine 118 computing Volume Weighted Average Price features. In some embodiments, Volume Weighted Average Price features for input normalization may involve computing current Volume Weighted Average Price features and quoted Volume Weighted Average Price features.

Current VWAP:

Current VWAP can be normalized by the current VWAP adjusted using a clipping bound, such as between −4 and 4 or 0 and 1, for example.

Quote VWAP:

Quote VWAP can be normalized by the quoted VWAP adjusted using a clipping bound, such as between −3 and 3 or −1 and 1, for example.

Market Spread Features

In some embodiments, input normalization may involve the training engine 118 computing market spread features. In some embodiments, market spread features for input normalization may involve spread averages computed over different time frames.

Several spread averages can be computed over different time frames according to the following equations.

Spread Average $\mu$:

Spread average $\mu$ can be the difference between the bid and the ask on the exchange (e.g. on average how large is that gap). This can be the general time range for the duration of the order. The spread average can be normalized by dividing the spread average by the last trade price adjusted using a clipping bound, such as between 0 and 5 or 0 and 1, for example.

Spread $\sigma$:

Spread $\sigma$ can be the bid and ask value at a specific time step. The spread can be normalized by dividing the spread by the last trade price adjusted using a clipping bound, such as between 0 and 2 or 0 and 1, for example.

Bounds and Bounds Satisfaction

In some embodiments, input normalization may involve computing upper bounds, lower bounds, and a bounds satisfaction ratio. The training engine 118 can train the reinforcement learning network 110 using the upper bounds, the lower bounds, and the bounds satisfaction ratio.

Upper Bound:

Upper bound can be normalized by multiplying an upper bound value by a scaling factor (such as 10, for example).

Lower Bound:

Lower bound can be normalized by multiplying a lower bound value by a scaling factor (such as 10, for example).

Bounds Satisfaction Ratio:

Bounds satisfaction ratio can be calculated by a difference between the remaining volume divided by a total volume and remaining order duration divided by a total order duration, and the lower bound can be subtracted from this difference. The result can be divided by the difference between the upper bound and the lower bound. As another example, bounds satisfaction ratio can be calculated by the difference between the schedule satisfaction and the lower bound divided by the difference between the upper bound and the lower bound.

Queue Time:

In some embodiments, platform 100 measures the time elapsed between when a resource task (e.g., a trade order) is requested and when the task is completed (e.g., order filled), and such time elapsed may be referred to as a queue time. In some embodiments, platform 100 computes a reward for reinforcement learning neural network 110 that is positively correlated to the time elapsed, so that a greater reward is provided for a greater queue time. Conveniently, in such embodiments, automated agents may be trained to request tasks earlier which may result in higher priority of task completion.

Orders in the Orderbook

In some embodiments, input normalization may involve the training engine 118 computing a normalized order count or volume of the order. The count of orders in the order book can be normalized by dividing the number of orders in the orderbook by the maximum number of orders in the orderbook (which may be a default value). There may be a clipping bound.

In some embodiments, the platform 100 can configured interface application 130 with different hot keys for triggering control commands which can trigger different operations by platform 100.

One Hot Key for Buy and Sell:

In some embodiments, the platform 100 can configured interface application 130 with different hot keys for triggering control commands. An array representing one hot key encoding for Buy and Sell signals can be provided as follows:
  Buy: [1, 0]
  Sell: [0, 1]
  One Hot Key for Action:
  An array representing one hot hey encoding for task actions taken can be provided as follows:
  Pass: [1, 0, 0, 0, 0, 0]
  Aggressive: [0, 1, 0, 0, 0, 0,]
  Top: [0, 0, 1, 0, 0, 0]
  Append: [0, 0, 0, 1, 0, 0]
  Prepend: [0, 0, 0, 0, 1, 0]
  Pop: [0, 0, 0, 0, 0, 1]
  In some embodiments, other task actions that can be requested by an automated agent include:
  Far touch—go to ask
  Near touch—place at bid
  Layer in—if there is an order at near touch, order about near touch
  Layer out—if there is an order at far touch, order close far touch
  Skip—do nothing
  Cancel—cancel most aggressive order
  In some embodiments, the fill rate for each type of action is measured and data reflective of fill rate is included in task data received at platform 100.

In some embodiments, input normalization may involve the training engine 118 computing a normalized market quote and a normalized market trade. The training engine 118 can train the reinforcement learning network 110 using the normalized market quote and the normalized market trade.
  Market Quote:
  Market quote can be normalized by the market quote adjusted using a clipping bound, such as between −2 and 2 or 0 and 1, for example.
  Market Trade:
  Market trade can be normalized by the market trade adjusted using a clipping bound, such as between −4 and 4 or 0 and 1, for example.
  Spam Control:
  The input data for automated agents 180 may include parameters for a cancel rate and/or an active rate. Controlling such rate may
  Scheduler:
  In some embodiment, the platform 100 can include a scheduler 116. The scheduler 116 can be configured to follow a historical Volume Weighted Average Price curve to control the reinforcement learning network 110 within schedule satisfaction bounds computed using order volume and order duration. The scheduler 116 can compute schedule satisfaction data to provide the model or reinforcement learning network 110 a sense of how much time it has in comparison to how much volume remains. The schedule satisfaction data is an estimate of how much time is left for the reinforcement learning network 110 to complete the requested order or trade. For example, The scheduler 116 can compute the schedule satisfaction bounds by looking at a different between the remaining volume over the total volume and the remaining order duration over the total order duration.

In some embodiments, automated agents may train on data reflective of trading volume throughout a day, and the generation of resource requests by such automated agents need not be tied to historical volumes. For example, conventionally, some agent upon reaching historical bounds (e.g., indicative of the agent falling behind schedule) may increase aggression to stay within the bounds, or conversely may also increase passivity to stay within bounds, which may result in less optimal trades.

The scheduler 116 can be configured to follow a historical VWAP curve. The difference is that the bounds of the scheduler 116 are fairly high, and the reinforcement learning network 110 takes complete control within the bounds.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-implemented system for training an automated agent, the system comprising:
- a communication interface;
- at least one processor;
- memory in communication with said at least one processor;
- software code stored in said memory, which when executed at said at least one processor causes said system to:
  - instantiate an automated agent that maintains a reinforcement learning neural network and generates, according to outputs of said reinforcement learning neural network, signals for communicating resource task requests;
  - receive, by way of said communication interface, first task data including values of a given resource for tasks completed in response to requests communicated by said automated agent and in response to requests communicated by other entities in a first time interval;
  - process said first task data to compute a first performance metric reflective of performance of said automated agent relative to said other entities in said first time interval, said processing said first task data comprises computing an un-normalized first performance metric and normalizing the un-normalized first performance metric using an average spread for said given resource;
  - receive, by way of said communication interface, second task data including values of the given resource for tasks completed in response to requests by said automated agent and in response to requests by other entities in a second time interval;
  - process said second task data to compute a second performance metric reflective of performance of said automated agent relative to said other entities in the second time interval;
  - compute a reward for the reinforcement learning neural network that reflects a difference between said second performance metric and said first performance metric; and
  - provide said reward to the reinforcement learning neural network of said automated agent to train said automated agent.

2. The computer-implemented system of claim 1, wherein said memory stores a master model including data for instantiating automated agents, and wherein said automated agent is instantiated according to said master model.

3. The computer-implemented system of claim 2, wherein said automated agent is a first automated agent, and wherein said code when executed at said at least one processor further causes the system to instantiate a second automated agent according to said master model.

4. The computer-implemented system of claim 2, wherein said code, when executed at said at least one processor, further causes the system to instantiate a plurality of additional automated according to the master model.

5. The computer-implemented system of claim 3, wherein said code, when executed at said at least one processor, further causes said system to obtain update data from at least one of said first automated agent and said second automated agent, and to process said update data to modify the master model.

6. The computer-implemented system of claim 5, wherein said code, when executed at said at least one processor, further causes said system to, upon modifying the master model in response to update data from at least one of the automated agents, apply a corresponding modification to at least the other one of the automated agents.

7. The computer-implemented system of claim 1, wherein said memory further stores a task completion schedule.

8. The computer-implemented system of claim 7, wherein said code, when executed at said at least one processor, further causes said system to detect that said task completion schedule has not been followed within pre-defined tolerances, upon processing at least one of said first task data and said second task data.

9. The computer-implemented system of claim 8, wherein said code, when executed at said at least one processor, further causes said system to apply a punishment to the reinforcement learning neural network, upon said detecting.

10. A computer-implemented method of training an automated agent, the method comprising:
- instantiating an automated agent that maintains a reinforcement learning neural network and generates, according to outputs of said reinforcement learning neural network, signals for communicating resource task requests;
- receiving, by way of said communication interface, first task data including values of a given resource for tasks completed in response to requests communicated by said automated agent and in response to requests communicated by other entities in a first time interval;
- processing said first task data to compute a first performance metric reflective of performance of said automated agent relative to said other entities in said first time interval, said processing said first task data comprises computing an un-normalized first performance metric and normalizing the un-normalized first performance metric using an average spread for said given resource;
- receiving, by way of said communication interface, second task data including values of the given resource for tasks completed in response to requests by said automated agent and in response to requests by other entities in a second time interval;
- processing said second task data to compute a second performance metric reflective of performance of said automated agent relative to said other entities in the second time interval;
- computing a reward for the reinforcement learning neural network that reflects a difference between said second performance metric and said first performance metric; and
- providing said reward to the reinforcement learning neural network of said automated agent to train said automated agent.

11. The computer-implemented method of claim 10, wherein said computing said reward comprises obtaining a plurality of delta volume-weighted average prices (VWAPs), each delta VWAP reflecting a difference in VWAP computed for successive time intervals.

12. The computer-implemented method of claim 11, wherein said computing said reward comprises computing a mean of said delta VWAP and a standard deviation of said delta VWAP.

13. The computer-implemented method of claim 12, wherein said computing said reward comprises computing an un-normalized reward and normalizing said un-normalized reward using said mean of said delta VWAP and said standard deviation of said delta VWAP.

14. The computer-implemented method of claim 12, wherein said computing said reward comprises using an equation:

$$\frac{\Delta VWAP_{2,1} - \mu \Delta VWAP}{\sigma \Delta VWAP}$$

where $\Delta VWAP_{2,1}$ is a difference between VWAP computed for said second time interval and VWAP computed for said first time interval, $\mu \Delta VWAP$ is said mean of said delta VWAP, and $\sigma \Delta VWAP$ is said standard deviation of said delta VWAP.

15. The computer-implemented method of claim 14, wherein said computing said reward comprises using an equation:

$$reward = \frac{CLIP\left[\frac{\Delta VWAP_{2,1} - \mu \Delta VWAP}{\sigma \Delta VWAP}, \{-1, 1\}\right]}{10}.$$

16. The computer-implemented method of claim 10, wherein said given resource comprises a given security traded in a trading venue, said tasks completed in response to requests comprise trades of said security in said trading venue, and values of said given resource comprise prices of said trades of said security and volumes of said trades of said security.

17. The computer-implemented method of claim 16, wherein said processing said first task data comprises VWAP for trades completed in said first time interval in response to requests communicated by said automated agent and computing VWAP for trades completed in response to requests communicated by all entities.

18. The computer-implemented method of claim 16, wherein said processing said second task data comprises VWAP for trades completed in said second time interval in response to requests communicated by said automated agent and computing VWAP for trades completed in response to requests communicated by all entities.

19. The computer-implemented method of claim 17, wherein said first performance metric is computed to reflect a difference between said VWAP for trades completed in response to requests communicated by said automated agent and VWAP for trades completed in response to requests communicated by all entities.

20. The computer-implemented method of claim 16, wherein said normalizing comprises normalizing according to an equation:

$$VWAP_{normalized} = \frac{VWAP_{algo} - VWAP_{market}}{spread_{market\ average}}$$

in which $VMAP_{algo}$ is VWAP computed for trades of said given security completed in said first time interval in response to requests communicated by said automated agent, and VWAPmarket is VWAP computed for trades of said given security completed in said first time interval in response to requests communicated by all entities.

21. The computer-implemented method of claim 10, further comprising detecting that a task completion schedule has not been followed within pre-defined tolerances upon processing at least one of said first task data and said second task data.

22. The computer-implemented method of claim 21, further comprising applying a punishment to the reinforcement learning neural network, upon said detecting.

23. The computer-implemented method of claim 10, further comprising:
receiving, by way of said communication interface, third task data including values of the given resource for tasks completed in response to requests by said automated agent and in response to requests by other entities, respectively, in a third time interval;
processing said second task data to compute a third performance metric reflective of performance of said automated agent relative to said other entities in the third time interval;
computing a further reward for the reinforcement learning neural network that reflects a difference between said third performance metric and said second performance metric; and
providing said further reward to the reinforcement learning neural network of said automated agent to train said automated agent.

24. A non-transitory computer-readable storage medium storing instructions which when executed adapt at least one computing device to:
instantiate an automated agent that maintains a reinforcement learning neural network and generates, according to outputs of said reinforcement learning neural network, signals for communicating resource task requests;
receive, by way of said communication interface, first task data including values of a given resource for tasks completed in response to requests communicated by said automated agent and in response to requests communicated by other entities, respectively, in a first time interval;
process said first task data to compute a first performance metric reflective of performance of said automated agent relative to said other entities in said first time interval, said processing said first task data comprises computing an un-normalized first performance metric and normalizing the un-normalized first performance metric using an average spread for said given resource;
receive, by way of said communication interface, second task data including values of the given resource for tasks completed in response to requests by said automated agent and in response to requests by other entities, respectively, in a second time interval;
process said second task data to compute a second performance metric reflective of performance of said automated agent relative to said other entities in the second time interval;
compute a reward for the reinforcement learning neural network that reflects a difference between said second performance metric and said first performance metric; and
provide said reward to the reinforcement learning neural network of said automated agent to train said automated agent.

25. A computer-implemented method of training an automated agent, the method comprising:
instantiating an automated agent that maintains a reinforcement learning neural network and generates, according to outputs of said reinforcement learning neural network, signals for communicating resource task requests;

receiving, by way of said communication interface, first task data including values of a given resource for tasks completed in response to requests communicated by said automated agent and in response to requests communicated by other entities in a first time interval;

processing said first task data to compute a first performance metric reflective of performance of said automated agent relative to said other entities for said first time interval, said processing said first task data comprises computing an un-normalized first performance metric and normalizing the un-normalized first performance metric using an average spread for said given resource;

computing a reward for the reinforcement learning neural network that reflects a difference between said first performance metric and a second performance metric reflective of performance of said other entities, wherein computing the reward is based on a difference between a volume-weighted average price (VWAP) for said automated agent for the first time interval and a market VWAP for the first time interval; and providing said reward to the reinforcement learning neural network of said automated agent to train said automated agent.

26. A computer-implemented system for training an automated agent, the system comprising:

a communication interface;

at least one processor;

memory in communication with said at least one processor;

software code stored in said memory, which when executed at said at least one processor causes said system to:

instantiate an automated agent that maintains a reinforcement learning neural network and generates, according to outputs of said reinforcement learning neural network, signals for communicating resource task requests;

receive, by way of said communication interface, first task data including values of a given resource for tasks completed in response to requests communicated by said automated agent and in response to requests communicated by other entities for a first time interval;

process said first task data to compute a first performance metric reflective of performance of said automated agent relative to said other entities in said first time interval, said processing said first task data comprises computing an un-normalized first performance metric and normalizing the un-normalized first performance metric using an average spread for said given resource;

compute a reward for the reinforcement learning neural network that reflects a difference between said first performance metric and a second performance metric reflective of performance of said other entities, wherein computing the reward is based on a difference between a volume-weighted average price (VWAP) for said automated agent for the first time interval and a market VWAP for the first time interval; and provide said reward to the reinforcement learning neural network of said automated agent to train said automated agent.

27. A non-transitory computer-readable storage medium storing instructions which when executed adapt at least one computing device to:

instantiate an automated agent that maintains a reinforcement learning neural network and generates, according to outputs of said reinforcement learning neural network, signals for communicating resource task requests;

receive, by way of said communication interface, first task data including values of a given resource for tasks completed in response to requests communicated by said automated agent and in response to requests communicated by other entities for a first time interval;

process said first task data to compute a first performance metric reflective of performance of said automated agent relative to said other entities in said first time interval, said processing said first task data comprises computing an un-normalized first performance metric and normalizing the un-normalized first performance metric using an average spread for said given resource;

compute a reward for the reinforcement learning neural network that reflects a difference between said first performance metric and a second performance metric reflective of performance of said other entities, wherein computing the reward is based on a difference between a volume-weighted average price (VWAP) for said automated agent for the first time interval and a market VWAP for the first time interval; and provide said reward to the reinforcement learning neural network of said automated agent to train said automated agent.

* * * * *